Figure 1:
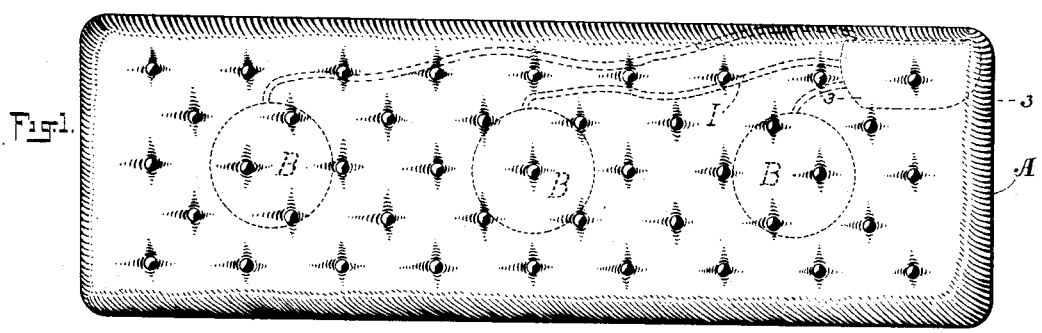

No. 610,268. Patented Sept. 6, 1898.
E. T. GILLILAND.
RECORDER FOR CONVEYANCES.
(Application filed Aug. 27, 1897.)

(No Model.)

Witnesses
Geo. W. Taylor
B. M. Scott

Inventor
Ezra T. Gilliland
By his Attorney Clarence L. Burger

THE NORRIS PETERS CO., PHOTO-LITHO., WASHINGTON, D. C.

UNITED STATES PATENT OFFICE.

EZRA TORRENCE GILLILAND, OF NEW YORK, N. Y.

RECORDER FOR CONVEYANCES.

SPECIFICATION forming part of Letters Patent No. 610,268, dated September 6, 1898.

Application filed August 27, 1897. Serial No. 649,678. (No model.)

*To all whom it may concern:*

Be it known that I, EZRA TORRENCE GILLILAND, a citizen of the United States, residing in New York, (Pelham Manor,) in the county of Westchester and State of New York, have invented a new and useful Improvement in Recorders for Conveyances; and I do hereby declare that the following is a full, clear, and exact description of the same.

The special purpose of my invention is to furnish the owners of public carriages and other passenger conveyances with a check on the receipts of and business done by the driver of each conveyance.

Most transportation and cab companies who let passenger conveyances suffer heavy losses by reason of their drivers accounting for and turning over only part of their actual receipts and pocketing the balance. It being impossible for the owners to keep track of the business done by each driver, his statements of his receipts have usually to be accepted, and his thefts are often never discovered. To remedy this state of affairs, I effect an automatic record in each conveyance of the exact time each passenger enters and leaves the conveyance, the exact number of passengers occupying it at any time, and the times and periods when the conveyance is traveling and stationary. Thus by examining this record at the close of each day the owner can ascertain very nearly what business the driver has done and what amount he should have received and should account for. To effect this automatic record in the conveyance, I employ, primarily, an appropriate time-recording device suitably controlled by the burden on the seat of a passenger, the times of whose presence or absence are thus automatically recorded.

To record the number of passengers at any time, separate recording devices and separate passenger-actuated controllers are provided at each seat.

The periods when the conveyance is in motion and at rest are recorded by means of a time-indicating record and a marker or recorder which is mounted so as to make its record only when vibrated or oscillated by the jarring of the moving conveyance, no record being made when the conveyance is stationary.

The concrete example in which I have reduced my invention to practice comprises also various other novel features, and I shall therefore describe in detail the mode in which I carry my invention in its entirety into practice and then point out its various features in the claims.

Reference is to be had by numbers to the accompanying drawings, forming part of this specification, in which the same parts are designated by like letters throughout.

Figure 2:
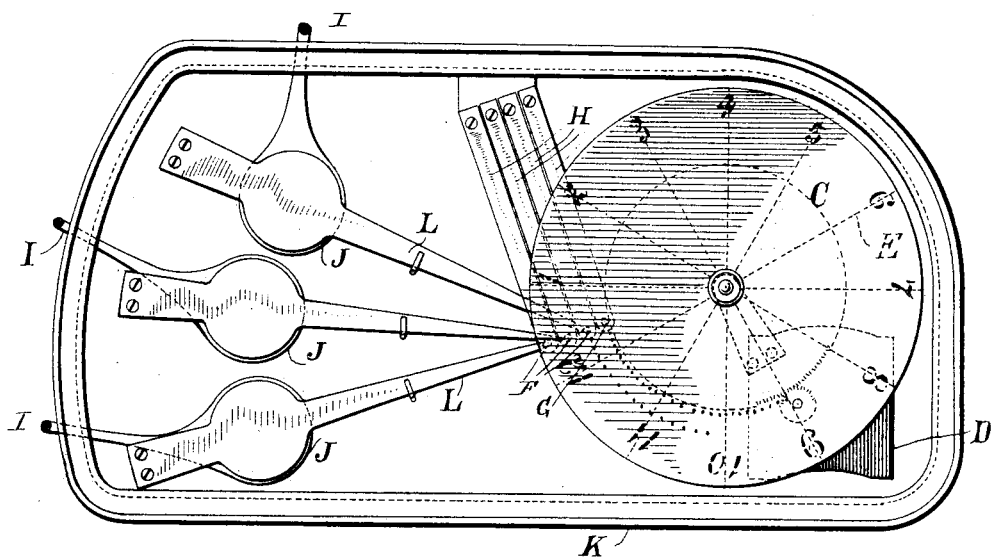
Figure 3:
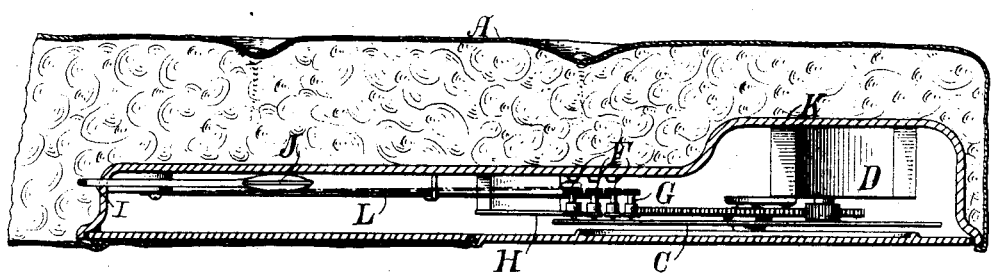

Figure 1 of the drawings represents in plan view a form of recorder for conveyances in which I have reduced my invention to practice. Fig. 2 is an enlarged inverted plan view of part thereof. Fig. 3 is a sectional view of the same on the line 3 3, Fig. 1.

In order to derive a controlling influence from the presence or absence of a passenger in the conveyance, I provide the seat of the conveyance with a part which yields or moves under the burden of a passenger thereon. Evidently the bottom of the seat is best for this purpose, although in some cases the back of the seat might possibly be used. Said controlling part I prefer to incorporate with the seat, so that it will be moved thereby under the burden, but might be external to and adjoining the seat, so as to be affected directly by the burden.

In the reduction to practice illustrated the seat A is represented as capable of holding two persons side by side and as being the ordinary yielding cushion which rests on the seat-box of a carriage.

For convenience, to prevent tampering with my recorder and for other reasons, I prefer to inclose my controlling parts B and, in fact, the entire mechanism of the recorder in the cushion A, though such arrangement is of course not essential to the main features of my invention.

I likewise prefer to use as the controlling parts B simple air-inflated cushions, of rubber or other air-tight material, inclosed in the seat-cushion A, so that a person sitting on the seat will compress the air-cushions B, which compressed air I thus utilize to govern the action of the recording device.

In the double-seat cushion A, I inclose, by preference, a controlling-cushion B at each end and also one at the middle, and provide separate recording devices controlled by each cushion B, so that if a single person occupies either end or the middle of the seat the presence of a single person only on the seat will be indicated on the record by either cushion B alone or by one end and the middle cushion B together, which would indicate the same thing, whereas if two persons occupy the seat A their joint presence will be indicated by both the end cushions B.

For a recording device or devices I, by preference, use a detachable rotary paper or impression dial C, serving as a record, actuated by ordinary clockwork mechanism D and having radial lines E marked thereon indicating the hours of the day, and pencils or markers F, serving as recorders, controlled by the respective air-cushions B and arranged along a radial line on the dial C, so that at any hour of the day the markers F will be on a line E indicating that hour, and correspondingly any fractions of the hour.

I, by preference, mount the recording devices, together with the adjacent parts of my recorder, in a rigid case K, which I inclose in an extreme rear corner of the seat-cushion A, as shown, so as not to interfere with the comfort of the occupants.

The markers F are mounted on light springs H, which when at rest hold the markers out of contact with the dial C, but when made to vibrate cause the markers to make broken concentric lines of dots or marks on the dial.

I likewise provide another vibrating marker G, like the markers F and next the same, to make still another record on the dial C. This vibration of the markers F and G and consequent recording action is produced automatically by the jarring of its support caused by the motion of the conveyance over the pavement. Therefore when the conveyance is stationary the markers will not record. The marker G therefore will record on the dial C the exact periods of time the conveyance is in motion and not in motion. The markers F, I cause to be restrained normally from vibrating on the dial C, even when the conveyance is in motion, by means of spring-mounted dampers L.

To cause the markers F to record when and according as the respective air-cushions B are compressed, as before described, I connect each air-cushion B by a flexible air-transmission tube I, inclosed in the seat-cushion A, with a small inflatable rubber or other suitable pad J, held under a corresponding one of the dampers L, so that when either of the air-cushions is compressed by the burden of a passenger on the corresponding part of the seat the compressed air therefrom will inflate and expand the connected pad J, disengage the damper L from the corresponding marker F, and thus cause the marker to record the fact and time on the dial C. Similarly when the pressure is removed from the air-cushion the corresponding pad J will contract and cause the damper to again stop the recording action of the marker F. The continuity of the lines made by the markers F with respect to the radial time-lines on the dial C will thus indicate when and by how many passengers the conveyance was occupied. The line made by the marker G will also indicate when the conveyance was in motion, as before described. In this way the business done by the conveyance will be shown with sufficient accuracy by examining the record at the close of the day and a valuable check on the driver's receipts thus be afforded.

I preferably employ the recording device whose recorder makes only intermittent contact with the record, for the reason that continual contact would be an injurious drag on the clockwork mechanism; but it is evident that almost any kind of an indicating or recording device may be used in the practice of my invention without departing from its boundaries. It is further evident that innumerable other devices may be substituted for the air-cushion shown to derive a controlling influence from the burden of a passenger on the seat within the scope and spirit of my invention.

The means for communicating the controlling influence from the burden-actuated part to the recording device would in any case vary with the nature of the recording device and burden-actuated part employed, the particular communicating means here shown being, as I have found, particularly well suited for the specific form of my invention here described.

It is usually advantageous to so adjust the recorder-controlling devices illustrated that while the burden of a passenger on the respective air-cushion will influence the recording device a lesser burden, such as that of a bag or parcel, would have no such influence. A proper adjustment of the tension of the damper or marker springs serves this purpose simply and effectually.

The air-cushions B here illustrated may also be enveloped in a flexible metallic or other armor to prevent the cushions from being punctured by intention or accident.

What I claim as new is—

1. The combination, with a conveyance or other support which is jarred or shaken, of a movable record, and a vibrating carrier holding the marker, when quiet, immediately off the record, but when jarred or shaken vibrating said marker repeatedly into and out of contact with the record so as not to drag thereon.

2. The combination, with a conveyance or other like movable support having a seat, of a movable record, a recording-marker, a vibrating spring-arm carrying the marker, when quiet, immediately off the record, but when jarred or shaken, vibrating said marker into and out of contact therewith, a damper to engage and stop the vibrations of said marker-carrying arm, and means whereby the burden of an occupant on the seat throws the damper out of engagement with the vibrating marker-carrying arm.

In testimony whereof I have hereunto set my hand.

EZRA TORRENCE GILLILAND.

In presence of—
  CLARENCE L. BURGER,
  WILLIAM R. BAIRD.